United States Patent
Mezghani et al.

(10) Patent No.: US 9,834,471 B2
(45) Date of Patent: Dec. 5, 2017

(54) SEALING AGENT FOR ION TRANSPORT MEMBRANES

(71) Applicant: KING FAHD UNIVERSITY OF PETROLEUM AND MINERALS, Dhahran (SA)

(72) Inventors: Khaled Mezghani, Dhahran (SA); Mohammed Abdel-Aziz Mostafa Habib, Dhahran (SA); Amir Hamza, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 225 days.

(21) Appl. No.: 14/944,207

(22) Filed: Nov. 17, 2015

(65) Prior Publication Data

US 2017/0137318 A1 May 18, 2017

(51) Int. Cl.
| | |
|---|---|
| *B01D 53/22* | (2006.01) |
| *C03C 8/24* | (2006.01) |
| *B01D 63/00* | (2006.01) |
| *C03C 3/091* | (2006.01) |
| *C03C 14/00* | (2006.01) |

(52) U.S. Cl.
CPC .............. *C03C 8/24* (2013.01); *B01D 53/228* (2013.01); *B01D 63/00* (2013.01); *C03C 3/091* (2013.01); *C03C 14/004* (2013.01); *B01D 2053/221* (2013.01); *B01D 2313/04* (2013.01); *C03C 2214/20* (2013.01)

(58) Field of Classification Search
CPC ..... C03C 2214/20; C03C 14/004; C03C 8/24; C03C 3/091; B01D 2313/04; B01D 63/00; B01D 2053/221; B01D 53/228; B01D 53/22
See application file for complete search history.

(56) References Cited

U.S. PATENT DOCUMENTS

| 3,397,790 A | * | 8/1968 | Navoy ................... A23L 2/085 |
| | | | 210/321.83 |
| 5,584,997 A | * | 12/1996 | Yagihashi .............. B01D 53/22 |
| | | | 210/321.79 |

(Continued)

OTHER PUBLICATIONS

Kim et al. "Polarization and stability of La2NiO4+δ in comparison with La0.6Sr0.4Co0.2Fe0.8O3-δ as air electrode of solid" international journal of hydrogen energy, Jun. 2016.*

(Continued)

*Primary Examiner* — Anthony Shumate
(74) *Attorney, Agent, or Firm* — Oblon, McClelland, Maier & Neustadt, L.L.P.

(57) ABSTRACT

A sealing agent for ion transport membranes (ITMs) includes a composition having a glass powder and a ceramic powder. The ceramic powder can include $Ba_{0.5}Sr_{0.5}Co_{0.8}Fe_{0.2}O_{3-\delta}$ (BSCF) or $La_2NiO_{4+\delta}$ (LNO). The ceramic powder can be identical to the ceramic powder from which the ITM is made. The glass powder can include PYREX glass. The sealing agent can be in the form of a paste. The sealing agent can be used to attach an ion transport membrane to one or more support tubes. The sealing agent includes from about 10 wt. % to about 40 wt. % glass powder and from about 60 wt. % to about 90% wt. % (BSCF) ceramic powder.

13 Claims, 4 Drawing Sheets

(56) References Cited

U.S. PATENT DOCUMENTS

| | | | |
|---|---|---|---|
| 9,725,662 B2* | 8/2017 | Kriegel | C10J 3/72 |
| 2003/0026848 A1* | 2/2003 | Joshi | A01N 59/16 |
| | | | 424/600 |
| 2003/0230363 A1* | 12/2003 | Sturgill | C23C 22/83 |
| | | | 148/243 |
| 2005/0011358 A1* | 1/2005 | Yamada | B01D 53/22 |
| | | | 96/4 |
| 2007/0184324 A1* | 8/2007 | Lyons | C04B 35/48 |
| | | | 429/486 |
| 2008/0011604 A1* | 1/2008 | Stevens | C25B 1/04 |
| | | | 204/242 |
| 2010/0320871 A1* | 12/2010 | Suenaga | C04B 35/495 |
| | | | 310/330 |
| 2011/0109704 A1* | 5/2011 | Furuya | B41J 2/055 |
| | | | 347/71 |
| 2011/0318403 A1* | 12/2011 | Raskin | A61K 8/922 |
| | | | 424/443 |
| 2012/0135331 A1* | 5/2012 | Rosseinsky | H01M 4/9016 |
| | | | 429/482 |
| 2012/0288746 A1* | 11/2012 | Abe | H01M 2/0287 |
| | | | 429/162 |
| 2013/0310780 A1* | 11/2013 | Phillips | A61L 15/26 |
| | | | 604/319 |
| 2014/0201985 A1* | 7/2014 | Fujita | B01D 63/06 |
| | | | 29/700 |
| 2015/0145926 A1* | 5/2015 | Yonemura | H01L 41/0973 |
| | | | 347/68 |
| 2016/0040081 A1* | 2/2016 | Kriegel | B01D 63/06 |
| | | | 48/197 FM |
| 2016/0136571 A1* | 5/2016 | Kriegel | B01D 53/227 |
| | | | 95/54 |

OTHER PUBLICATIONS

Dahl et al. "Fabrication, sealing and high pressure testing of tubular La2NiO4+δ membranes for air separation" Energy Procedia vol. 23, 2012, pp. 187-196.*

Qi et al., "Ceramic Glass Composite High Temperature Seals for Dense Ionic-Conducting Ceramic Membranes", J. of Membrane Science 2001, 93, 105-193.

* cited by examiner

SEALING AGENT FOR ION TRANSPORT MEMBRANES

BACKGROUND OF THE INVENTION

1. Field of the Invention

The present invention relates to sealing materials, and particularly to a sealing agent composition for sealing ion transport membranes (ITM).

2. Description of the Related Art

Ion transport membranes (ITMs) have been identified as very promising materials for separating oxygen from air with nearly perfect selectivity. Such membranes can be used for systems that require an oxygen rich environment, like oxy-fuel power plants. The operational temperature for this oxygen separation process is from about 700-1100° C. depending on the material used to prepare the ITM. Sealing the membranes between the support tubes at such high temperatures is a critical issue. If the membrane is not sealed perfectly, the air from the surroundings will mix with the separated oxygen on the permeate side of the membrane.

During the initial years of the ITM technology, many researchers tried to seal the ceramic membranes between metallic support tubes by brazing. Standard reactive metal brazing technology using titanium as an active element, however, requires high vacuum at high temperatures during brazing. These conditions destroy the required crystal structure in the membranes. Other known solutions include reactive air brazing (RAB) based on Ag—CuO brazes, which is performed in atmospheric air instead of a high vacuum. The bond thus formed becomes a permanent one upon cooling. Support tubes can be made from ceramic materials like alumina or quartz instead of a metal due to high operating temperatures.

Several researchers have attempted to use glass in the form of rings or paste to seal the membrane/support tube setup. The setup seals when the glass melts to fill the gaps between the membrane and the tube. However, at temperatures above the melting point of the glass, the glass continues to flow which may result in a loss of sealing. Also glass may react at high temperature with the membrane causing the seal to break. It also tends to diffuse towards the center of the membrane from the edges which causes the effective area available for permeability to reduce and errors in the calculation of oxygen flux to occur.

Thus, an improved membrane sealing agent material solving the aforementioned problems is desired.

SUMMARY OF THE INVENTION

A sealing agent for ion transport membranes (ITMs) can be used to seal gaps between an ion transport membrane and one or more support tubes adjoined thereto. The sealing agent includes a glass powder and a ceramic powder. The ceramic powder can include $Ba_{0.5}Sr_{0.5}Co_{0.8}Fe_{0.2}O_{3-\delta}$ (BSCF) or $La_2NiO_{4+\delta}$ (LNO). The ceramic powder can be identical to the ceramic powder from which the ITM is made. The glass powder can include PYREX glass. The sealing agent can be in the form of a paste. The sealing agent can include from about 10 wt. % to about 40 wt. % glass powder and from about 60 wt. % to about 90% wt. % (BSCF) ceramic powder.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A sealing agent for ion transport membranes (ITMs) includes a composition having a glass powder and a ceramic powder. The ceramic powder can include $Ba_{0.5}Sr_{0.5}Co_{0.8}Fe_{0.2}O_{3-\delta}$ (BSCF) or $La_2NiO_{4+\delta}$ (LNO). The ceramic powder can be identical to the ceramic powder from which the ITM is made. The glass powder can include PYREX glass. The sealing agent can be used to seal gaps that exist between the ITM and one or more adjoined support tubes. The one or more support tubes can include a ceramic or metal material. Preferably, the one or more supports include ceramic. The sealing agent can be in the form of a paste. The sealing agent can include from about 10 wt. % to about 40 wt. % glass powder and from about 60 wt. % to about 90% wt. % ceramic powder. Preferably, the composition includes about 20 wt. % PYREX glass powder and about 80 wt. % ceramic powder.

As used herein, the term PYREX (trademarked as PYREX) refers to a brand introduced by Corning Inc. for a line of clear, low-thermal-expansion borosilicate glass used for laboratory glassware and kitchenware. The composition of both Corning 7740 and Schott 8830 is given as 80.6% $SiO_2$, 12.6% $B_2O_3$, 4.2% $Na_2O$, 2.2% $Al_2O_3$, 0.04% $Fe_2O_3$, 0.1% CaO, 0.05% MgO, and 0.1% Cl. According to the National Institute of Standards and Technology, borosilicate Pyrex is composed of (as percentage of weight): 4.0% boron, 54.0% oxygen, 2.8% sodium, 1.1% aluminum, 37.7% silicon, and 0.3% potassium.

The sealing agent can be prepared by providing crushed Pyrex glass pieces; milling the crushed glass pieces in an alumina jar mill using alumina balls to obtain glass powder; and mixing the glass powder with a ceramic powder and water to form a paste. For example, the ceramic powder can be $Ba_{0.5}Sr_{0.5}Co_{0.8}Fe_{0.2}O_{3-\delta}$ (BSCF) powder. The BSCF powder can be prepared by first preparing a gel using a sol-gel process and then calcining the resulting gel at 250° C. for 30 minutes to obtain the BSCF powder. The powder can be heated at 1000° C. for 10 hours and then ball milled for 24 hours in the alumina jar mill with alumina balls. The glass and BSCF powder can then be milled to provide a mixture. Water can be added to the mixture to provide the sealing agent in the form of a paste.

Figure 1:
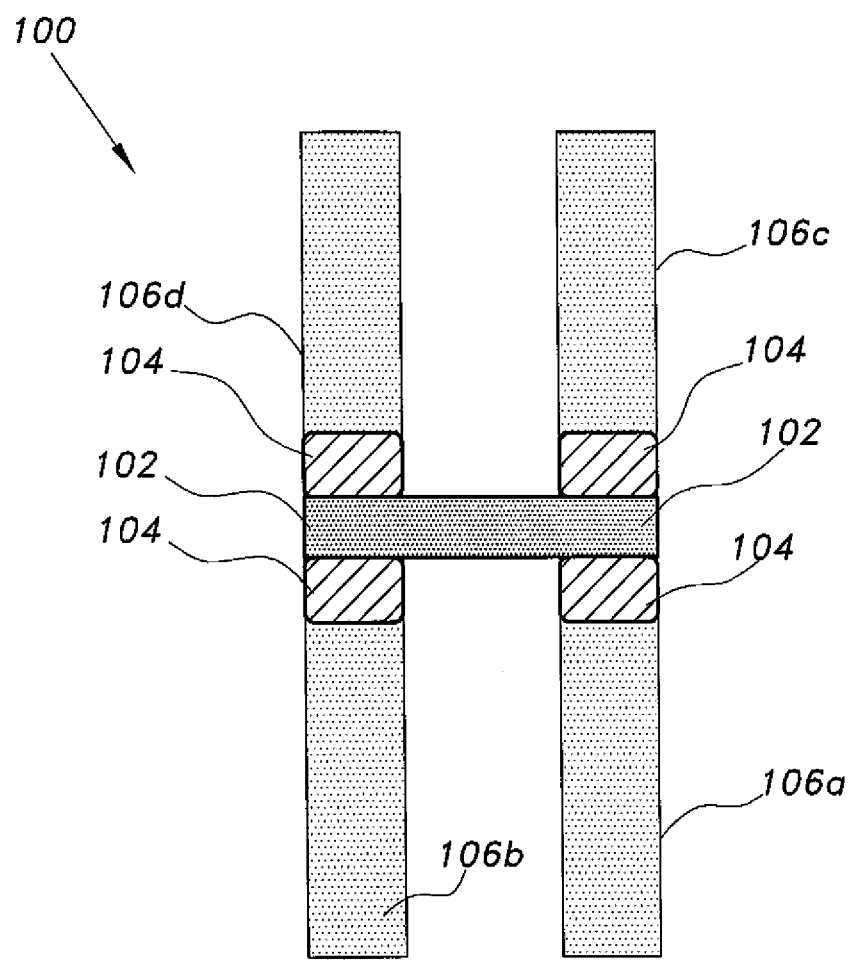
FIG. 1 is a diagram showing the parts of an exemplary gas separation system.

A method of attaching an ITM to at least one support tube includes applying a uniform layer of sealing agent to a surface of the at least one support to provide a coated surface and disposing the ITM on the coated surface to provide a gas separation system including the sealing agent described herein. The gas separation system can be heated for at least thirty minutes and then cooled to provide a hermetic or gas-tight seal between the ITM and the at least one solid support. FIG. 1 shows an exemplary gas separation system including support tubes 106a-106d, the ITM 102, and the sealing agent 104.

EXAMPLE 1

Preparation of Sealing Agent

A standard PYREX beaker was crushed and the crushed glass was ball milled for 24 hours in a standard alumina jar mill using alumina balls. The $Ba_{0.5}Sr_{0.5}Co_{0.8}Fe_{0.2}O_{3-\delta}$ (BSCF) powder was made from a sol-gel process, where solutions made from nitrates of Ba, Sr, Co and Fe were mixed in stoichiometric ratios and heated while stirring. Ethylene glycol and citric acid were used as polymerization and chelating agents. The resulting gel was calcined at 250° C. for 30 minutes to obtain a powder. This powder was heat treated at 1000° C. for 10 hours and then ball milled for 24 hours in the alumina jar mill with alumina balls. After the Pyrex glass and BSCF powders were milled, mixtures of Pyrex glass powder and BSCF powder with varying concentrations were prepared as illustrated in Table 1. The mixtures were milled for some more time to ensure homogeneity. The typical particle size of the Pyrex and BSCF powders were less than 1 micron in diameter. Finally, some distilled water was added to the mixtures to form a paste.

EXAMPLE 2

Attaching the ITM to Alumina Tubes Using the Sealing Agent

The surfaces of the membrane (ITM) and the alumina support tubes were smoothly polished. A uniform layer about 1 mm thick of the sealing agent was then applied with a spatula on the lower alumina tube surfaces. The membrane (ITM) to be attached to the alumina support tubes was placed over this paste. A layer of the paste was then applied between the top of the membrane and the top alumina tubes as well. After slightly pressing the tubes against the membrane, heat was used to allow the sealing agent to seal the membrane to the tubes. The membrane started to seal at around 830° C. at a rate of 2° C./min. The temperature was maintained at 950° C. for about 30 minutes for optimum sealing. The seal was tested in the temperature range of 800-1100° C., and was found to work well at these temperatures.

EXAMPLE 3

Figure 2:
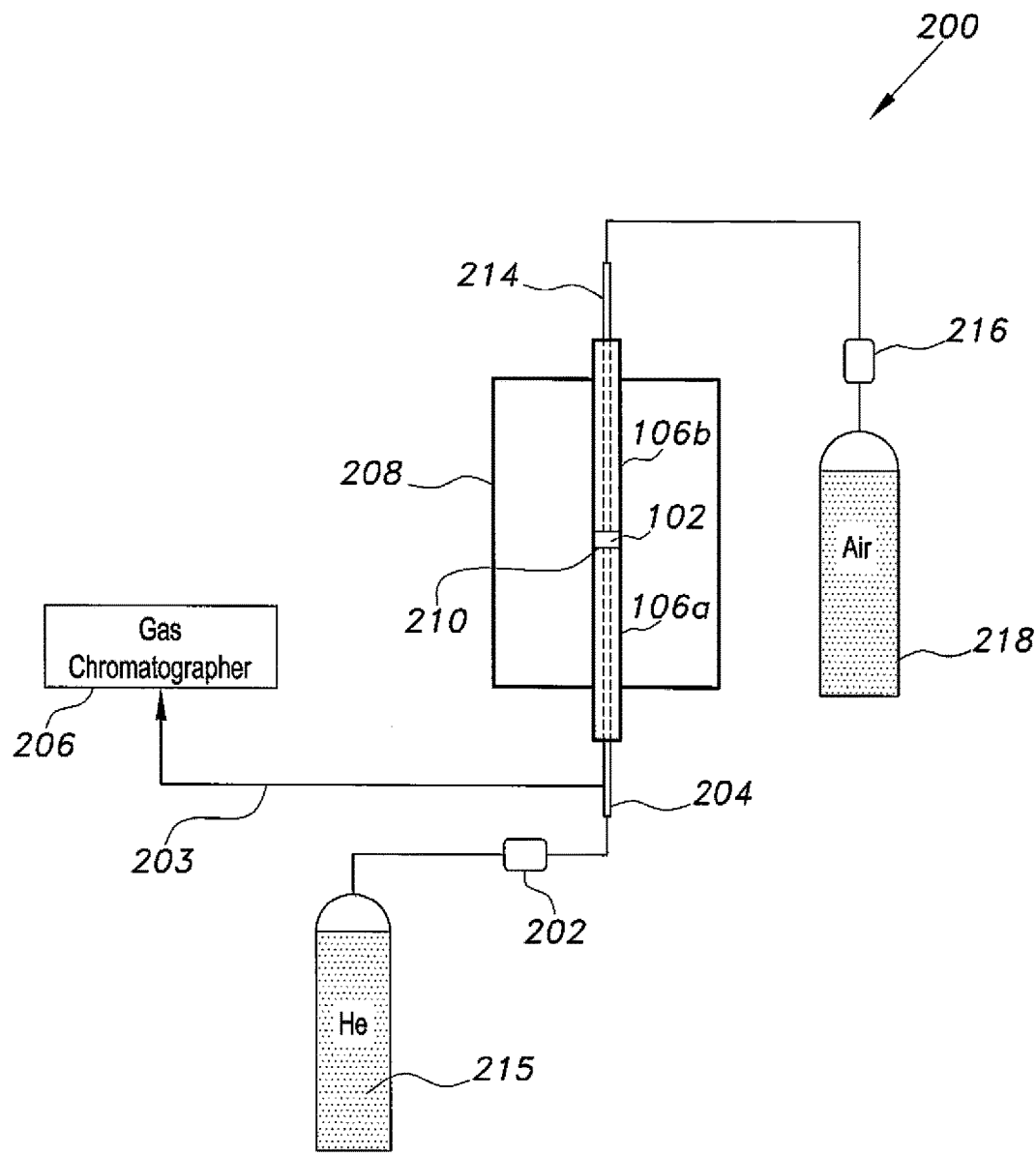
FIG. 2 is a diagram showing an exemplary gas separation system connected to a gas permeation measuring system.

Testing an Exemplary Gas Separation System (BSCF Membrane) Including the Sealing Agent An exemplary gas separation system 210 including the sealing agent described herein was tested using the gas permeation measuring system 200 shown in FIG. 2. A BSCF membrane was used. The exemplary gas separation system including the sealing agent described herein 210 was heated by the furnace 208 of the system 200. Air was supplied from a tank 218 through a flow meter 216 into the top aluminum tube 106b to heat the tubes. Helium (He) from a helium tank 215 was introduced through a flow meter 202 as the sweep gas for the lower tube 106a, which carried the permeated oxygen 203 to the gas chromatograph 206 in a gas stream 203. The gas chromatograph 206 measured the quantity of $O_2$ and any other gases present in the stream 203. Any presence of nitrogen in the permeate gas stream 203 would indicate an improper sealing of the membrane. The ITM used was a BSCF membrane that was about 0.9 mm thick.

A total of four mixtures of BSCF and Pyrex powders (referenced in Table 1) were tested. The mixtures varied in amounts of glass and BSCF. The permeation tests were carried out in temperatures ranging from about 700° C. to about 1100° C. The results of these tests are presented in Table 1. As illustrated in Table 1, it was found that the mixtures with 30 and 40 wt. % Pyrex always sealed the membrane between the aluminum support tubes but that this sealing agent was not desirable due to a strong chemical reaction with the membrane material. The bond was also found to be too strong to allow removal of the membrane without breakage. On the other hand, the sealing agent with 10 wt. % Pyrex glass formed a weak bond between the tube and the membrane. As a result it was unable to provide a suitable seal on a regular basis. However, the sealing agent with 80 wt. % BSCF powder and 20 wt. % Pyrex was found to be the best sealing material in all of the experiments. This sealing agent provided desirable bond strength, allowed reuse of the membrane, and resulted in no visible reaction with the membrane material. Thus, this composition is the best sealing material for the ITM based gas separation applications.

TABLE 1

Summary of Test Results of Seals of Ion Transport Membranes

| Sr # | BSCF powder (wt. %) | Pyrex glass (wt. %) | Observation |
|---|---|---|---|
| 1 | 60 | 40 | Good wetting, very strong bond, considerable reaction between glass and membrane |
| 2 | 70 | 30 | Good wetting, very strong bond, slight reaction between glass and membrane |
| 3 | 80 | 20 | Good wetting, desirable bond strength, no reaction between glass and membrane |
| 4 | 90 | 10 | Poor wetting, weak bond, no reaction |

Figure 3:
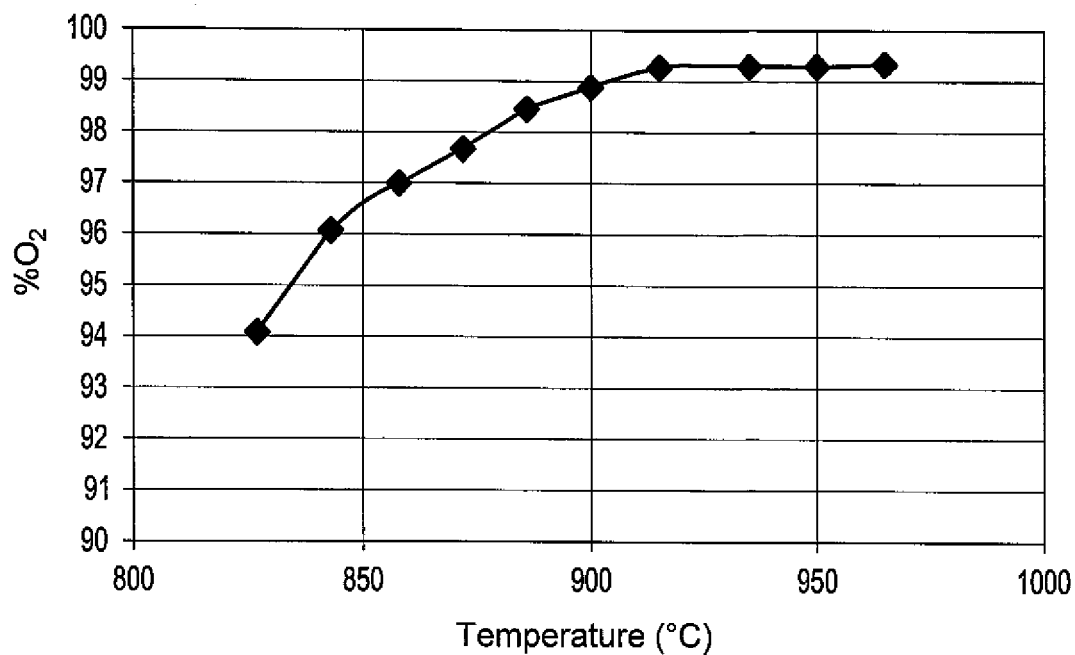
FIG. 3 is a graph showing the percentage of oxygen at the permeate side of the membrane during heating of the exemplary gas separation system by the gas permeation measuring system.
Figure 4:
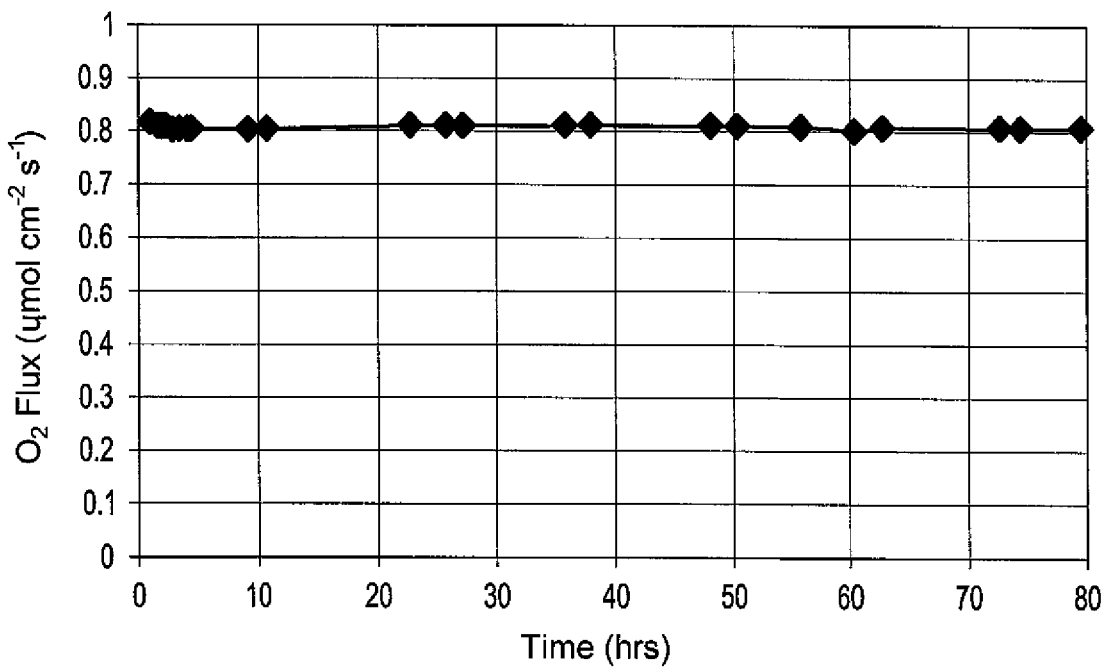
FIG. 4 is a graph showing the oxygen permeability of a 0.9 mm thick BSCF membrane at 905° C.

FIG. 3 is a graph showing the percentage of oxygen at the permeate side of the membrane during heating of the exemplary gas separation system including the sealing agent described herein. As can be seen, by the time the temperature crosses 900° C., the amount of oxygen at the permeate side is above 99%. As such, the sealing agent was working very well at very high temperatures. FIG. 4 is a graph showing the oxygen permeability of the BSCF membrane (0.9 mm thick) at 905° C.

The glass/ceramic mixture prepared from the technique described above has very good wetting properties with both the membrane and the alumina tube. Because the glass content is only 20%, there is not a significant chemical reaction with the membrane material. Also the presence of ceramic particles unexpectedly trap the glass once it melts and stops it from diffusing towards the center of the membrane. As illustrated in FIG. 4, this is shown by the excellent stability in the flux of oxygen through the 0.9 mm thick BSCF membrane for 80 hours.

EXAMPLE 4

Figure 5:
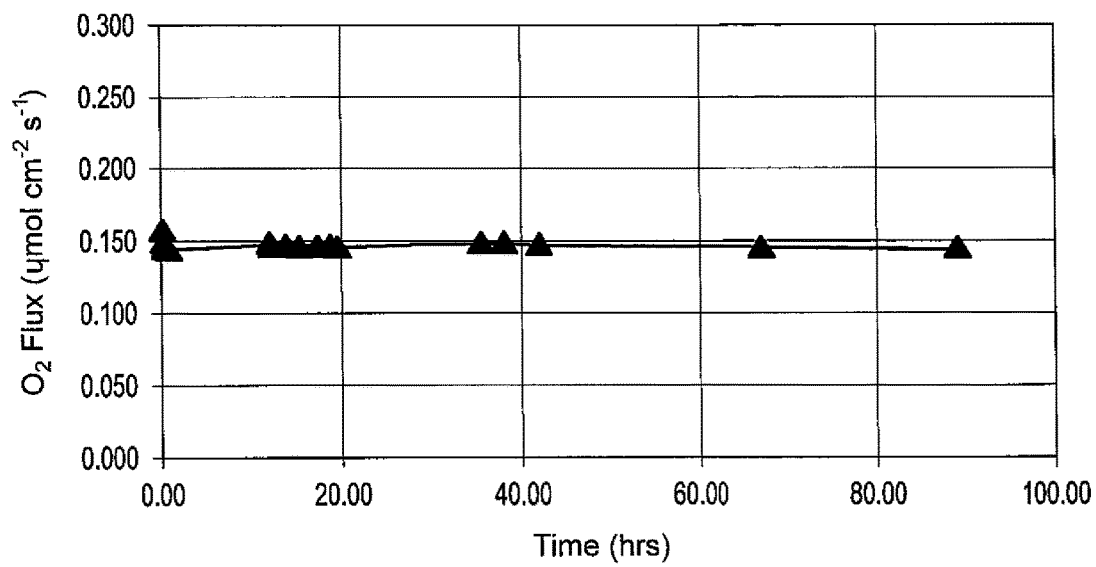
FIG. 5 is a graph showing oxygen permeability of a 1 mm thick $La_2NiO_{4+\delta}$ (LNO) membrane at 900° C.

Testing an Exemplary Gas Separation System ($La_2NiO_{4+\delta}$ (LNO) Membrane) Including the Sealing Agent The oxygen permeability of an $La_2NiO_{4+\delta}$ (LNO) membrane was also shown to be very stable with the sealing agent at 900° C. as shown in FIG. 5.

It is to be understood that the present invention is not limited to the embodiments described above, but encompasses any and all embodiments within the scope of the following claims.

We claim:

1. A sealing agent for ion transport membranes comprising:
a composition including about 10 wt. % to about 40 wt. % glass powder and about 60 wt. % to about 90% wt. % ceramic powder, the ceramic powder including at least one of $Ba_{0.5}Sr_{0.5}Co_{0.8}Fe_{0.2}O_{3-\delta}$ (BSCF) and $La_2NiO_{4+\delta}$ (LNO).

2. The sealing agent for ion transport membranes according to claim 1, wherein the composition is a paste.

3. The sealing agent for ion transport membranes according to claim 1, wherein the glass powder has a composition including 4.0% boron, 54.0% oxygen, 2.8% sodium, 1.1% aluminum, 37.7% silicon, and 0.3% potassium composition.

4. The sealing agent for ion transport membranes according to claim 1, wherein the composition includes about 20 wt. % glass powder.

5. The sealing agent for ion transport membranes according to claim 1, wherein the composition includes about 80 wt. % ceramic powder.

6. A method of preparing a sealing agent for ion transport membranes comprising the steps of:
providing glass pieces;
milling the glass pieces to obtain glass powder;
mixing the glass powder with ceramic powder to form a mixture, the ceramic powder including at least one of $Ba_{0.5}Sr_{0.5}Co_{0.8}Fe_{0.2}O_{3-\delta}$ (BSCF) and $La_2NiO_{4+\delta}$ (LNO); and
adding water to the mixture to form a paste.

7. The method of preparing a sealing agent for ion transport membranes according to claim 6, wherein the ceramic powder is prepared by first preparing a gel using a sol-gel process, calcining the resulting gel at 250° C. for 30 minutes to obtain a powder, heating the powder at 1000° C. for 10 hours, and milling the powder for 24 hours.

8. The method of preparing a sealing agent for ion transport membranes according to claim 6, wherein the step of milling the glass pieces comprises is ball milling the glass pieces, the ball milling of the glass pieces being conducted in an alumina jar mill with alumina balls.

9. The method of preparing a sealing agent for ion transport membranes according claim 6, wherein the mixture includes about 20 wt. % glass powder and about 80 wt. % ceramic powder.

10. The method of preparing a sealing agent for ion transport membranes according to claim 6, wherein the glass powder and the ceramic powder are less than 1 micron in diameter.

11. A gas separation system comprising:
(a) an ion transport membrane, the ion transport membrane including a ceramic material;
(b) a sealing agent including about 10 wt. % to about 40 wt. % glass powder and about 60 wt. % to about 90 wt. % ceramic powder, the ceramic powder being identical to the ceramic material of the ion transport membrane, the ceramic powder of the sealing agent including at least one of $Ba_{0.5}Sr_{0.5}Co_{0.8}Fe_{0.2}O_{3-\delta}$ (BSCF) and $La_2NiO_{4+\delta}$ (LNO); and
(c) one or more support tubes secured to the ion transport membrane and the sealing agent.

12. The gas separation system according to claim 11, wherein the sealing agent comprises about 20 wt. % glass powder.

13. The gas separation system according to claim 11, wherein the sealing agent comprises about 80 wt. % ceramic powder.

* * * * *